May 26, 1936. E. A. STALKER 2,041,787
AIRCRAFT
Filed Oct. 25, 1933  5 Sheets-Sheet 1

May 26, 1936.  E. A. STALKER  2,041,787
AIRCRAFT
Filed Oct. 25, 1933   5 Sheets-Sheet 2

INVENTOR
Edward A. Stalker

May 26, 1936.    E. A. STALKER    2,041,787
AIRCRAFT
Filed Oct. 25, 1933    5 Sheets-Sheet 3

INVENTOR
Edward A. Stalker

May 26, 1936. E. A. STALKER 2,041,787
AIRCRAFT
Filed Oct. 25, 1933 5 Sheets-Sheet 4

INVENTOR
Edward A. Stalker

May 26, 1936. E. A. STALKER 2,041,787
AIRCRAFT
Filed Oct. 25, 1933  5 Sheets-Sheet 5

FIG.14

INVENTOR
Edward A. Stalker

Patented May 26, 1936

2,041,787

UNITED STATES PATENT OFFICE 2,041,787

AIRCRAFT

Edward A. Stalker, Ann Arbor, Mich.

Application October 25, 1933, Serial No. 695,149

30 Claims. (Cl. 244—19)

My invention relates to aircraft sustained directly by rotatable wings and particularly to a means of propulsion incorporating the use of boundary layer energization and to means of controlling the aircraft as a function of the rotating wings. It is a continuation in part of my previous application filed February 17, 1933. Serial No. 657,174.

One object of the present invention is the provision of lifting wings rotatable about an axis by means of a sheet of fluid discharged out the wing surface toward the trailing edge.

The second object is to provide for the control of the aircraft about all three body axes particularly as a function of the operation of the wings.

The third object is to provide lateral control for the aircraft equipped with vertically oscillating wings.

A fourth object is to provide an automatic means of reducing the vertical oscillations of the wings.

A fifth object is to provide an increase of lift for climbing flight and an autorotative state for the wings should the propulsive prime mover or engine fail to deliver sufficient power.

Another object is to provide an aircraft that will be an organic whole as regards all the functions necessary for flight.

Other objects will appear from the accompanying description and drawings.

Some explanation of the theories underlying the objectives and their accomplishment are given before describing the construction of the invention.

Attention is first called to the fact that the failure of inventors to develop a direct lift aircraft has in part resulted from their inability to provide a satisfactory drive to rotate the wing system. In order to insure a safe descent with a helicopter for instance, the diameter of the airscrew must be very large, so large that without power applied to the airscrew shaft but with the airscrew autorotating, the rate of descent must be a safe value. This condition is necessary because of the ever present imminence of power plant failure. Then the airscrew diameter is so large that the engine cannot rotate it at engine speed. On the contrary a gear reduction of the order of at least 1 to 10 is necessary. The figures on a machine of ordinary proportions are instructive. Consider a typical machine of 300 horsepower forty foot diameter airscrew and having a distance from the center of gravity to the tail post of 15 feet. The torque of the engine at 1800 R. P. M. is 490 ft. lb. but due to a gear reduction of 10 to 1 the torque to rotate the airscrew is 4900 ft. lb. It has been proposed to counteract this torque, which would spin the fuselage or body oppositely to the wings, by an airscrew at the tail post rotating in the longitudinal plane of symmetry. If the center of gravity distance is 15 ft. the force at the tail post must be 327 lb. To produce this force would require about 60 horsepower (all of which energy is lost) and a propeller of about six feet in diameter, a figure too large to entertain.

To avoid the disadvantages of a gear drive the proposal has been made by many to rotate the wings by the momentum reaction of a fluid jet discharged at high speed from the tips of the wings. The tips are selected for the orifice because the efficiency of jet propulsion depends on and is the larger the greater the ratio of tip speed to jet speed. If these speeds are equal the discharged jet has no velocity relative to the ground and hence all its energy has been used by the wing and the efficiency is 100 per cent neglecting internal nozzle losses. To obtain sufficient reaction by the discharge from the tip the velocity of discharge must be high and hence the fluid which is always a gas must be highly compressed. Either positive compressors or blowers are proposed or some explosive is used which generates a very high pressure and by the use of an orifice a high velocity jet is discharged. Either these schemes have been proposed only or they have not succeeded. I mention them although I nevertheless proceed in a diametrically opposite direction with my invention.

I proceed on the theory that it is more effective to reduce the resistance than to overcome it especially if, as I shall show, the reduction in resistance is obtained almost entirely as a gratuity. As a concurrent donation the difficulty of the counter torque from the wings is suppressed.

The energization of the boundary layer of air on the lifting surfaces forms the basis of my method of propulsion. This layer is the small stratum of fluid adjacent the surface of a body wetted by it. The characteristic that sets this layer off from the rest of the fluid is its low velocity compared to the fluid further from the body. The small speed also indicates a deficiency of kinetic energy which has been lost as heat due to the rubbing of the fluid on the body. When the body is of such a shape that there are low pressure regions well forward on the body as is the case for a stream line form, the boundary layer has serious consequences; for on such a form there is near the maximum cross section a low pressure region which is able to reverse the flow in the boundary layer because the particles of fluid no longer have sufficient momentum to keep them moving rearward. The forward flow in the layer clashes with the rearward flow with resulting turbulence and failure of the main flow to follow the body contour. The wake of the body is then at a low pressure which draws back on the body—in other words a drag. The boundary layer is always present. In a wing it becomes huge on the upper surface at some large angle and precludes any further increase of lift.

The boundary layer may be suppressed by the simple expedient of adding to it at appropriate points a small amount of energy, very small in proportion to the energy which must be used to overcome the drag caused by the unsuppressed effects; or small in comparison to the lift gained.
A slot in the body surface formed to discharge rearward along and over a substantial surface is one method of adding energy. These slots should be narrow and they are most effective near the maximum cross section of the body. An opening normal to the surface, or inclined, subjected to a suction to withdraw the boundary layer before its direction reverses will also accomplish the desired result. In either case energy is added to the boundary layer, from which the general term of boundary layer energization is derived.

Suction is beneficial chiefly in the case of improving the lift where the drag is not important as in the landing of an aircraft, for then the suction adds to the lift. Where the drag is important it is always already a small quantity and the addition of the suction force if it acts with a rearward component even though small, may nevertheless still be an appreciable percentage of the small drag. On the contrary the use of blowing avail the aircraft of the jet reaction and as a gratuity the energization of the boundary layer which greatly reduces the drag of the body. In the case of a wing the lift is also increased by the blowing.
I propel the wings not with a jet blown from a nozzle of small cross section and formed by positive compressors or blowers creating a high pressure to get sufficient fluid through the small orifices, but with a sheet of fluid discharged through a slot extending over a major portion of the radius of the rotatable wing. By making the sheet of fluid serve the dual purpose of reducing the drag and providing a rotative thrust I am able to attain a lift adequate to sustain the aircraft and propel it forward when the axis of the rotating wings is inclined forward to give a forward component of force.

I am aware that the proposal has been made that very high pressure jets be blown out the upper surface of a horizontally rotatable propeller but I am not aware of any in which the openings were properly or effectively located, or extended over a sufficient length of radius to affect the boundary layer in a significant manner; nor am I aware of any jets created at low pressures or by means not employing heated jets to obtain the requisite velocity for the ordinary jet propulsion. The use of positive blowers and heating means are indicative of reliance on high velocity reactive drives only.

I employ comparatively low air pressures of such a magnitude that they may be created by ordinary blowers which rely on accelerating the air or gas rather than by changing its volume within the pump before releasing the charge.

The pressures also are not dependent on subsequent heating of the charge.

One of the objects of this invention is to combine a number of unique solutions to the direct lift aircraft problem so that the whole is an organic one, all the mechanisms cooperating to provide a stable and controllable flying machine. If the aircraft is an organic whole in flight, it must pass the following tests. The machine may be considered as suspended at a point which is the juncture of all three space axes. An aircraft has freedom to move along these axes in any manner and is also free to turn about them in any manner. That is, the aircraft has six degrees of freedom—three translations and three rotations are possible. Any of these motions may be of a general type, that is, not necessarily uniform but accelerated, and components of all six motions may occur simultaneously.

If the aircraft is an organic whole as regards its stability, there must be restoring moments arise when the aircraft is disturbed. Consider, then, to be explicit, a helicopter and let it be disturbed by a moment tending to tip up the front edge of the disk area swept by the rotating wings. The aircraft immediately tilts laterally due to gyroscopic action. If the aircraft is an organic whole as regards stability the aircraft must create moments tending to oppose both the initial and the gyroscopic moments and restore the aircraft to its original position. There must also be stability about the vertical axis. This is usually called directional stability or stability in yaw.

If the aircraft is an organic whole as regards control, it must be possible to direct the aircraft in any direction which calls for the ability to execute a rotation about any axis in any sense. In the case of the helicopter, for instance, it must be possible to yaw, pitch and roll the aircraft while stationary or in vertical descent— as well as during motion in any other direction. It will then be possible to maintain balance about all three axes.

Finally, if the aircraft is an organic whole as regards both balance and control, it must be possible to execute a maneuver about and along one axis without losing balance about another axis. Consider again the case of the helicopter and move the control stick so that the airplane pitches up at the nose. The gyroscopic moment at right angles to the pitch must be balanced. This balance must exist whether the aircraft is stationary or moving horizontally or vertically. Evidently to achieve both balance and control as described the aircraft must be highly organized.

This invention presents a direct lift aircraft as an organic whole as regards stability, balance and control.

Referring now more particularly to the drawings I will describe the means by which I accomplish the objects of this invention.

Figures 1, 2:
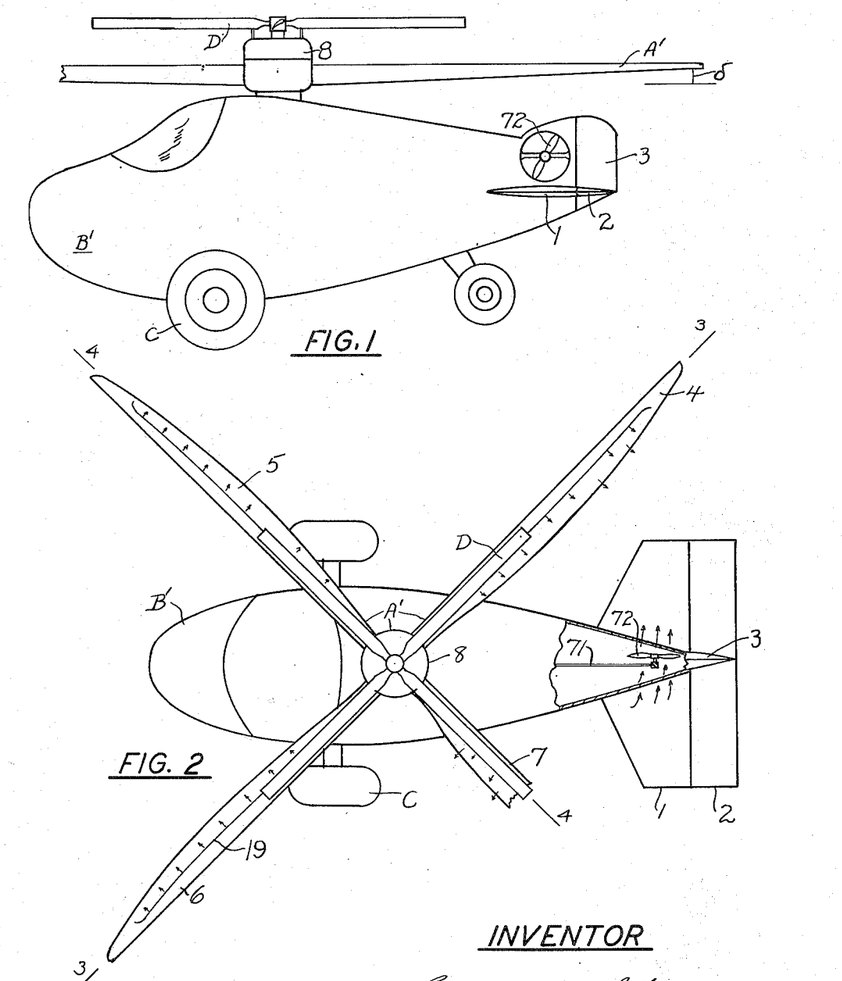
In Figure 1 I show a side elevation of the machine.
Figure 2 is a plan view of the aircraft.

In Figure 1 the airscrew or, as I shall call it, the wing system is A', the fuselage or body is B'. The landing gear is C. The stabilizer and elevator are indicated by the numerals 1 and 2 respectively, while the rudder is 3.

Figure 3:
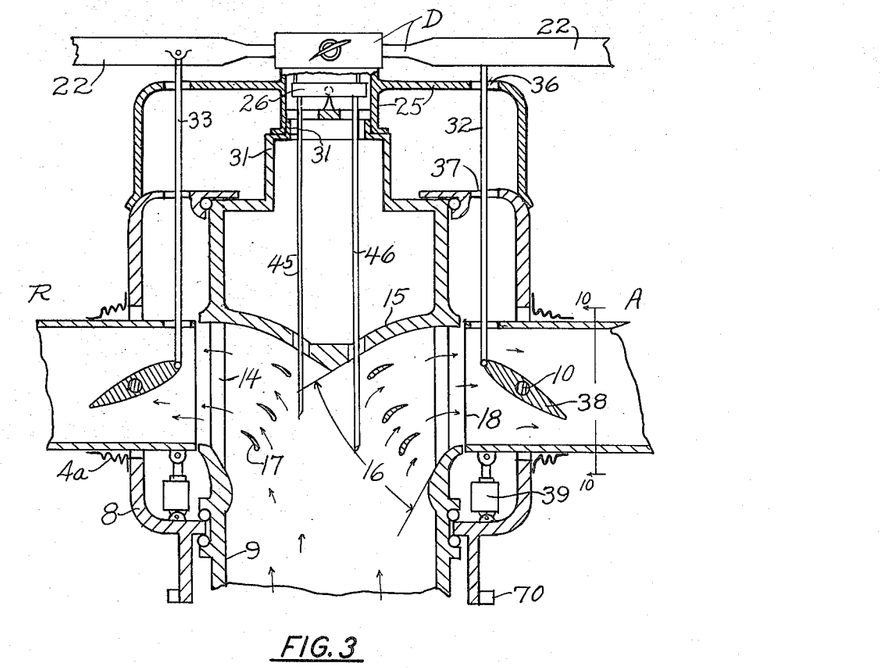
Figure 3 is a vertical section through the hub and stationary supporting shaft on the line 3—3 of Fig. 2.

Viewing Figures 1, 2, and 3 together it will be noted that the wings 4, 5, 6, and 7 are carried by the hub 8 mounted rotatably on the stationary shaft 9 by ball bearings. The structure to support and hold the shaft 9 stationary in the body B may be of any suitable character known in the art and forms no part of this invention. The wings are hollow and each is hinged on a pin 10 for vertical oscillation.

Figure 14:
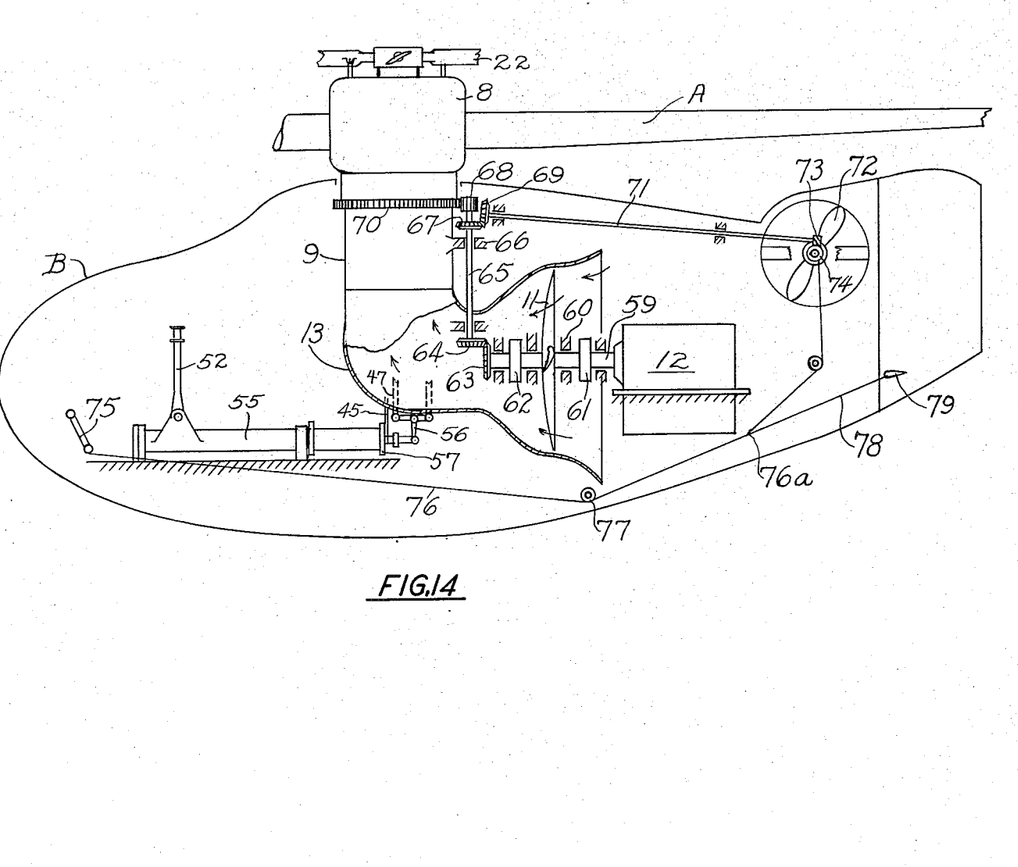
Figure 14 is a side view of the fuselage to show the relation of shaft, blower and directional airscrew. It is shown as though the fuselage covering were transparent.

Fluid, preferably air, is blown up the inside of the shaft 9 by an airscrew 11 shown in Figure 14 and driven by the engine 12. A light conduit 13 conducts the air from the airscrew to the shaft 9 and the shaft openings 14. The flow proceeds at a low velocity up the shaft 9 because of the large cross section which keeps low the friction losses with the walls. At the level of the wings, Figure 3, the curved partition 15 and the vanes 17 encircling the shaft deflect the flow into the open ends 18 of the wings. Particular heed should be paid to the bell mouth 16 similar to the entrance to a Venturi tube, for it performs this function. The fabric 40 should be used at joints to prevent leakage.

Figure 5:
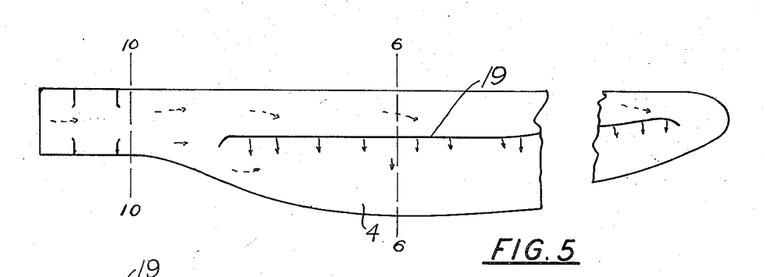
Figure 5 is a top plan of one of the main wings.

A large volume of air is needed within the wing because of the low pressure and the long discharge slot 19 shown in the wing plan of Figure 5. It is also desirable to keep the cross section of the root sections of the wings small to keep their resistance low because they compensate for their drag with very little lift. I harmonize these contradictory requirements by making the cross section as small as consistent with strength and practicability and then fashioning the wing interiorly so that the cross section gradually increases. In this manner I obtain a Venturi tube extending from the bell mouth in the shaft to near the tip of the wing. As is well known this formation of a tube will pass as much fluid through it as though there were no cross section of narrow form. To accomplish such a purpose as I outline an ordinary Venturi tube could have a diverging segment with an included angle of only 7 or 9 degrees. I am enabled to widen out the interior cross section inside the wing more rapidly because of the suction above the wing which acts through the slot 19 and aids the flow out of the slot.

Figure 6:
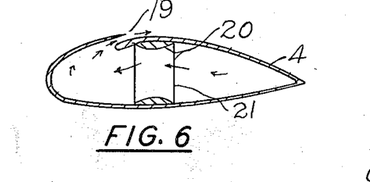
Figure 6 is a cross section along the line 6—6 of Figure 5.

The form of the slot is shown in Figure 6, which is a cross section of the wing. The slot is formed with a well rounded entrance and its walls direct the flow toward the trailing edge. Within the wing the spar 20 extends from the root to the tip and forms a part of the structure. The vertical members 21 of the spar are spaced apart so that the flow may progress chordwise in the wing as well as spanwise. See also Figure 5.

Figure 4:
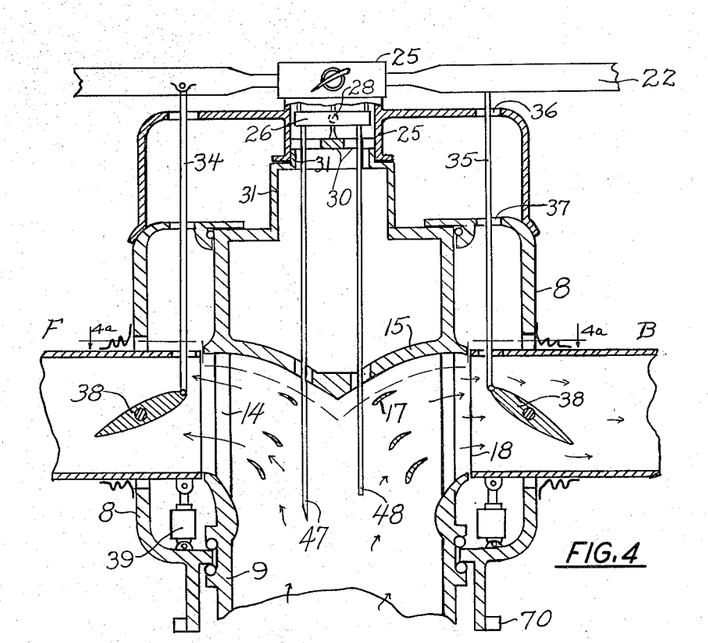
Figure 4 is a longitudinal vertical section of the hub and stationary shaft.
Figure 4A:
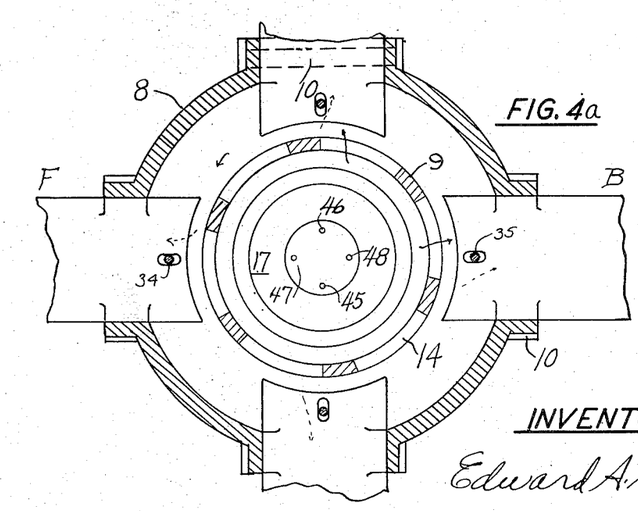
Figure 4a is a section through the hub at the level of the wings on line 4a—4a of Fig. 3.
Figure 7:
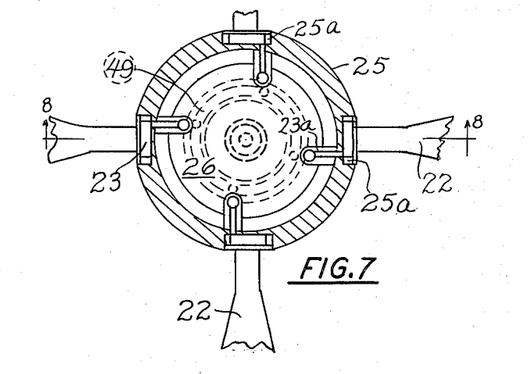
Figure 7 is a view from above of the control airscrew hub in section on line 7—7 of Figure 8 showing the hub ends of the wings and the pitch changing mechanism.
Figure 8:
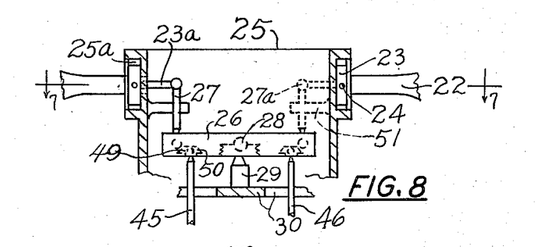
Figure 8 is a fragmentary vertical part section through the hub of the control airscrew and the supporting fulcrum.
Figure 9:
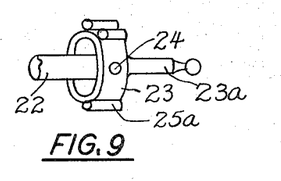
Figure 9 is a perspective view of the blade root and its ring for rotating the blades.

The wing system has an inherent unbalance laterally because the advancing wing has a higher velocity relative to the wind than the retreating wing. It is desirable to annihilate this unbalance and it is particularly desirable to accomplish this automatcally for all ratios of peripheral to forward speed. It is this ratio that determines the degree of lift dissymmetry. Hence the automatic means must be sensitive to changes of this ratio as well as the difference between the wind speed for advancing and retreating wings. The problem is solved by the placement of another airscrew horizontally rotatable about the axis of the main shaft 9. In Figures 3 and 4 the airscrew D has blades 22 which I designate as control blades to distinguish them from the main lifting wings. Other features are illustrated in Figures 7, 8 and 9. In these figures it will be observed that the blades are hinged within a ring 23 for free vertical oscillation about the pivot 24. The ring is mounted in the hub 25 on rollers 25a so that it may be rotated to change the pitch of the blade. Arms 23a extending inward from the rings 23 are attached to a disk block 26, which I call a lever, by ball and socket joints 27a and links 27. The lower ends of 27 are also balls socketed in the lever to produce universal connections. In turn the lever is mounted on the ball 28 so that it may wabble or tilt in any direction. The ball is formed on a shaft 29 supported as an integral part of a cross bar 30 of the housing 31 resting stationary on the end of shaft 9.

Figure 10:
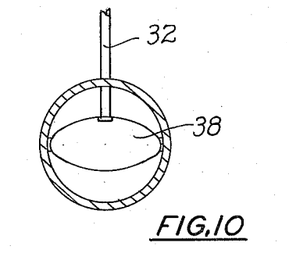
Figure 10 is a vertical cross section through the wing root to show the valve. It is taken along line 10—10 of Figure 5.

The control blades 22 are each located above a wing and accompany it as it rotates. This relationship is insured by the rods 32 and 33 in Figure 3 and 34 and 35 in Figure 4. because they pass through openings 36 and 37 in the hub. These rods are hinged to the control blades at the top and to the valves 38 at the bottom. The valves are also shown in Figure 10 which is a vertical cross section through the root. Each wing has a valve 38 of streamline form and tilted up at the leading edge. These valves are to control the flow to the wings and they are governed by the vertical oscillations of the control blades 22. Referring to an advancing blade as A and a retreating blade as R it is apparent that the advancing wing A will tend to rise but it has great inertia and is also restrained with respect to the body as will be described later. The control blade above having less inertia and being substantially unrestrained will rise more rapidly than the main wing and in rising will move valve 38 to constrict the flow to the advancing wing. On the retreating side the control blade descends and permits more air to pass the valve 38. The lift is proportional to the amount of air blown out the slot and by restricting and augmenting the flow the lifts of the wings are brought to the same value.

Figure 11:
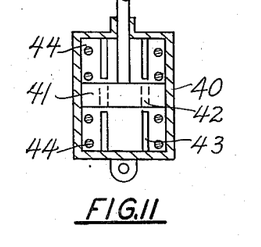
Figure 11 is a vertical section through a shock absorber.

In addition to upsetting moments from the difference of velocities, there are upsetting moments from gyroscopic forces if the wings have any rigidity in their connection to the hub 8. For the wings to tilt the aircraft rigidity must be present at least in the plane of the tilting moment, and I prefer to have an appreciable degree of rigidity in all the wings. The shock absorbers 39, Figures 3 and 4, provide the required degree of rigidity although these are designed to supply substantial freedom to the blades for a few degrees of vertical oscillation. I prefer a value of about 2 degrees but the functioning is not limited to this value. The shock absorber is shown in section in Figure 11 and consists of a cylinder 40 housing the piston 41. On one of the diameters of the piston are two holes 42 extending through to the faces. In line with these holes are four pins 43, two for each cylinder end and of a diameter somewhat smaller than the holes 42. The whole cylinder is filled with fluid. When the piston is moved in either direction the fluid flows through the holes 42 and practically no resistance is offered to the motion. In proceeding further the piston approaches the pins 43 and they eventually pass into the holes 42 and almost restrict the flow therethrough. In this regime of action the device functions as a shock absorber and will dissipate energy in forcing a flow through the holes. After further movement the piston encounters the springs 44 shown in cross section. They are very stiff and serve to absorb shock and bring the piston to a stop.

The small degree of vertical freedom allowed the wings spares the fuselage and its occupants from jars due to local gusts such as might hit one wing tip only. In a maneuver or gust that is very rapid the wings are saved from shock stresses by the shock absorber and the wings may therefore be built lighter.

Assume that a gust pitches the aircraft up at the nose, a positive pitch. Due to the rigidity of the wings there will be a rolling moment at right angles because of the inertia of the blades. Assume in Figure 3 that the section is viewed from the back and that the rotation is as indicated by A and R. A positive pitch will cause the advancing wing A to dip. At the same time the wing 22 above will also dip but it will not exert any moment on the aircraft because of the articulation to the hub. The wing, however, must roll the whole airplane of large inertia so that practically the control blade may be considered as dipping relative to a stationary wing. Its motion will be that quick relatively. When the blade 22 goes down it opens the valve 38 beneath and the ensuing augmentation of the flow out the slot 19 generates enough additional lift to restrain the gyroscopic roll. On the other hand the retreating wing tends to rise and if the phenomenon is traced it will be found that the valve 38 is closed by the control blade sufficiently to suppress the gyroscopic moment on this wing. Since the wings and blades are symmetrically disposed about the axis, the gyroscopic moments will be balanced for any action of the aircraft, be it a pitch or a roll that disturbs the aircraft.

It is desirable that it be possible to tilt the aircraft when hovering or flying vertically. Ordinary ailerons on fixed wings are ineffective when there is no flow rearward past them. I control the aircraft manually by altering the pitch of the blades 22. If I wish a roll I increase the pitch of the retreating blade 22 and decrease the pitch of the advancing blade. For a negative roll, the pitch is reversed. I arrange the mechanism for this purpose so that as each control blade approaches or leaves the lateral positions the pitch is gradually changed and there is no difference in pitch between the front and back blades. Figures 3, 7 and 8 will make the operations of the mechanism clear.

The pilot may tilt the lever 26 about any axis passing through the ball 28 by the rods 45 and 46 which control the lateral tilting and two similar rods 47 and 48 shown in Figure 4 to control the longitudinal tilt. These rods attach to a plate 49 carried in a recess 50 on the under side of the lever. The lever rotates about the ball 28 being carried around by the lugs 51 bearing on the links 27. The recessed plate is held stationary by the rods 45 to 48 which bear on cross bars 30 of the housing 31. See Figures 3 and 4. In tilting the lever rotates the ring 23 and changes the pitch of opposite blades differentially because the arms 23a are all attached to the trailing edge side of the rings. If the lever is not tilted fore and aft the blades will resume normal and equal pitches in the front and back positions. If I wish a positive roll I decrease the pitch of the retreating blade and increase the pitch of the advancing blade. Then the retreating blade will dip and open wider the valve 38 increasing the lift of the retreating wing. The valve 38 of the advancing wing will be closed further and cause the wing to dip. The moments of the lift will then roll the aircraft. Similar arguments will follow for a pitch, or a combination of a pitch and roll. It is only necessary in this case to tilt the lever about an axis oblique to the plane of symmetry of the aircraft.

It is important to observe that by this method of control the blades 22 at right angles to the induced moment are still able to correct the gyroscopic moment which will try to tilt the aircraft at right angles to the induced one. For instance if a positive roll is executed the nose of the aircraft will tend to tilt down. The front blade 22 will dip and increase the lift of the forward wing, the back blade will rise and decrease the lift of the rear wing; the two wings will then experience lift changes which will keep them horizontal. It is one of the important features of this invention that the control does not interfere with the automatic correction of the gyroscopic moment at right angles to the control moment.

Another feature of this invention is that the control moment is superimposed on the lift balancing action without interfering with its functioning. Consider the inherent lateral unbalance of lift in a helicopter. The freedom of oscillation of the blades 22 governs the lift of the lateral wings and brings them to equality. This basic equality is maintained even when an increment of lift is added to one control blade and subtracted from the opposite. That is, if the lift increments are reversed, the ensuing rolling moment is exactly equal, though of opposite sign, to the first rolling moment. If the control suspended the balancing action in some degree the aircraft would always roll more readily with the advancing wing ascending because it tends naturally to a higher lift than the retreating wing.

It is to be noted that the axis of the control blades is tilted when the wing system is tilted. In this respect it differs from a system in which a gyroscope is free to maintain its plane of rotation.

The control blades normally rotate with the tips above the horizontal. In this position the moment about the blade hinge due to the lift is balanced by the centrifugal force which acts above the hinge because the center of gravity of the blade is above the hinge. This method of operating a lifting blade is well known in the art.

Figure 12:
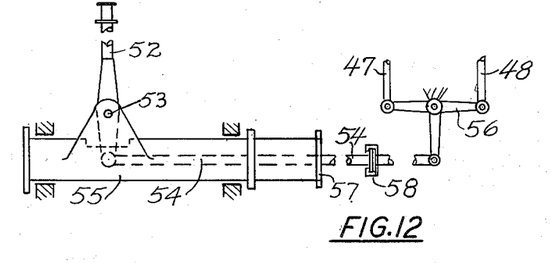
Figure 12 is a side view of the pilot's control shown removed from the aircraft.
Figure 13:
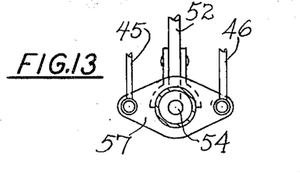
Figure 13 is a section along the line 13—13 of Figure 12.

The manual control mechanism for operating the rods to the lever 26 are shown in Figures 12 and 13. It is a conventional form. The control stick 52 is pivoted at 53 and by its oscillation pushes and pulls the tube 54 within the torque tube 55. The tube 54 oscillates the T-crank 56 to which are attached the rods 47 and 48. A lateral movement of the stick rotates the torque tube in suitable bearings and oscillates the arms 57 shown best in Figure 13. To these are attached the rods 45 and 46. A sleeve joint 58 permits the torque tube to turn without twisting the tube 54. If the motions of the stick and lever 26 are traced it will be found that a forward push on the stick tilts the lever 26 down in front which increases the pitch of the control blade, closes valve 38, and decreases the lift of the front wing so that it will dip. Thus the aircraft dives when the stick is pushed forward giving the standard relation between stick and aircraft maneuvers.

In Figure 14 the engine 12, as shown, drives the airscrew 11 by the shaft 59 borne rotatably in the bearings 60. The action is through the overrunning clutch 61 so that the airscrew cannot turn the engine. The shaft 59 extends ahead of the airscrew through another overrunning clutch 62. On the end of the shaft is the gear 63, the clutch 62 providing for rotation of gear 63 by the wings although gear 63 is not turned by the engine. Meshing with gear 63 is a bevel gear 64 on a vertical shaft 65 supported in the bearing 66. At the upper end this shaft has the bevel gear 67 and the spur gear 68. The former meshes with a bevel gear 69 and the latter with the hub gear 70.

If the engine fails the wings are rotated by the relative wind and turn the airscrew 11 but not the engine. The torque to rotate the airscrew 11 is very small because it is rotated at a very high speed in contrast to the speed of the wing system, which if driven would have a low speed and high torque. By relieving the wings of the engine torque more energy is available for the blower and the directional control to be described.

Directional control should be dependent on the wing system so that the control may be operated by the wings independently of the engine functioning. In Figure 14 the gear 70 turning the shaft 65 turns the bevel gears 66 and 69. The shaft 71 then turns the propeller 72 by means of helical gears 73 and 74. The rotation of the propeller will create a thrust to be used to direct the aircraft. The propeller is adjustable in pitch and the blades of symmetrical airfoil section are set in the hub so that the adjustment is from zero pitch to plus and minus values. I need not describe the mechanism because adjustable pitch propellers are well known and are available commercially. The important fact is that with a very small propeller a sufficient torque is available to direct the fuselage axis in any direction, even in descent because then the wings in their autorotation drive the propeller. The pilot controls the pitch of the propeller by the pedals 75 and cable 76 running over the pulleys 77 to the control lever of the adjustment mechanism. A cable 78 joins 76 and 76a and runs to the rudder horn 79 so that the rudder is operated simultaneously with the propeller 63.

When the engine is functioning the flow out the slots in the wings augments the effective angle of attack because the oncoming flow of air receives an upward component of velocity as is well known in the science of aerodynamics. This upflow is equivalent to increasing the pitch of the wings which is desirable for vertical ascent. If the engine fails air is still thrown by centrifugal force and the airscrew 11 out the slots. This pitch corresponds to the proper angles of attack of the wings to provide autorotation for the wings so that a sufficient lift is generated to land the aircraft safely. The control blades still continue to function by governing the flow through the wings and the manual control is still operative. The dihedral angle at which the wings are arranged introduces a stabilizing effect just as it does in fixed wing aircraft.

From the preceding disclosures it will now be apparent that the aircraft may be tilted in any direction under complete control and balance as regards both lift and gyroscopic moments, as a function of the lift on the rotatable wings, without regard to whether the aircraft is in horizontal or vertical flight, up or down. The unique features which I have related provide an aircraft that is an organic whole.

Some moments on the wing system may be classed as transverse moments because they are transverse to the plane of rotation. The terms upsetting and righting moments or tilting moments are applicable to any kind of rotating wing system in any fashion and are therefore more general.

The method of rotative drive provides an economical means of propulsion, provides simple transverse control and balance against lift and gyroscopic moments in conjunction with the functioning of the rotatable wing. Because the drive of the wings is adequate without producing a reactive torque the directional control is economical and may be made to depend on the wings. The sub units are organic or cooperative; for instance the motion along all horizontal axes is accomplished by tilting the axis of the wing system through the use of the boundary layer of the wings and vertical flight is likewise achieved; also the moments about all three axes are functions of the wing operation. Hence the organization of the aircraft may be traced through the qualities and properties of the boundary layer into the motion along and about all three axes making the whole aircraft an organic whole, a cooperative unit.

The main lifting wings of this invention are independently adjustable as to lift to achieve balance at all ratios of peripheral speed to forward speed of the aircraft. There is not an invariable interconnection between the lift of one wing and the lift of another. This is especially desirable because if the forward speed should for example be 100 miles per hour and the peripheral speed be 200 miles per hour, the relative speed of the advancing wing would be 300 miles per hour as distinguished from 100 miles per hour for the retreating blade. This ratio is therefore 3 to 1. However, if the forward speed is 150 miles per hour and the peripheral speed still 200 miles per hour the relative speed of the advancing wing with respect to the retreating wing would be 7 to 1. It is therefore clear that the ratio of the speed of travel of the advancing wing with respect to the speed of the retreating wing changes, requiring that the lifts of the wing be varied relatively to different degrees to effect balance at various speeds of forward flight.

The control blade is provided vertically with respect to its associated wing so the control blade and wing will operate in the same phase. If the control blade is provided substantially ahead of or behind the wing positioning so as to have a lead or lag phase angle proper balancing will not result, for at some time in a rotation of the wing the wing would be advancing while the blade is retreating, as when the blade has crossed, or is about to cross, the longitudinal axis. The blade would thus produce a change opposite to that desired. This, however, is avoided in accordance with the present construction.

Furthermore, in accordance with this invention the control blades by means of which the lifts of the wings are governed assume a position dependent upon centrifugal force and also upon their effective reaction on the air so that balance can be maintained at various speeds of rotation and at various speeds of forward flight.

While I have described the application of the various devices to a wing system rotating about an upright axis, as a preferred embodiment of my invention, it is to be understood that I do not limit myself to this construction only and that modifications and substitutions may be made in the specific form of the invention disclosed without departing from the spirit and scope of this invention which is defined in the appended claims.

What is claimed is:

1. In an aircraft sustained by a wing system comprising a plurality of wings rotatable about an upright axis, and attached to the aircraft with sufficient vertical restraint to create substantial gyroscopic moments on the aircraft when it is subjected to a disturbing moment, means providing for unsymmetrical alteration of the lifts of the wings, and an automatic mechanism to alter the lifts to maintain equilibrium against gyroscopic moments said mechanism including an element rotatable by the relative wind.

2. In an aircraft sustained directly by a wing system including a set of wings movable relative to the aircraft about a closed path, means providing for an alteration of the lift of the wings, pilot control means to create upsetting moments on the wing system for maneuvering the aircraft, and automatic means governing the degree of lift alteration to maintain a balance of gyroscopic moments on the wing set.

3. In an aircraft sustained directly by a wing system comprising a plurality of wings rotatable about an upright axis, a body, and a prime mover to cause rotation of the wings; such a combination of means so interrelated that balance may be achieved about all axes and including a means rotatable by the wing system to create different directional torques on the aircraft, means to create transverse control moments by altering the lifts of the laterally opposed wings unsymmetrically, and means to automatically maintain balance against transverse moments on the wing system arising from the unbalance of lift between advancing and retreating blades and from gyroscopic action.

4. In an aircraft sustained directly by a wing system comprising a plurality of wings rotatable about an upright axis, a body, and a prime mover to cause rotation of the wings, such a combination of means organically related that balance may be achieved about all axes and including: means rotatable by the wing system to create directional torques on the aircraft, means to create transverse control moments by altering the lifts of the wings, and means automatically to maintain balance against transverse moments on the wing system arising from gyroscopic action, said last means automatically altering the lift of the wings so that transverse inertia moments at right angles to a disturbing moment are suppressed.

5. In an aircraft sustained directly by a wing system including a plurality of wings rotatable in one direction about an upright axis, a body, means rotatably supporting said wings on the body, a prime mover to cause rotation of the wings, and mechanism organically related that balance and control may be achieved about all axes and including means operable manually to alter the lifts unsymmetrically on the wings to create a control moment about any horizontal axis; and rotatable aerofoils operable by the rotation of the wings to create directional control moments automatically about any horizontal axis during manual control of said manually operable means.

6. In an aircraft sustained directly by a wing system comprising a plurality of slotted wings rotatable about an upright axis and each having a slot in its surface, a body, and means organically related that translation and balance are achieved about all axes, and including means providing for unsymmetrical manual alteration of the lifts of the wings and automatic means for altering the lifts to suppress the inherent lift unbalance between opposite wings and for altering the lifts to suppress an inertia moment at right angles to the disturbing moment on the wing system; a means of rotating the wings comprising a blower and a prime mover therefor, means of communication between the blower and the wing slots to supply a flow of fluid serving the dual purpose of reducing the resistance of the wings and of creating a propelling force for them.

7. In an aircraft, rotatable lifting means to create a direct lift, controllable means providing for an alteration of the lift, a control blade rotatable about the blade axis and vertically oscillatable about an end, means operably interconnecting the control blade to said controllable means to govern the alteration of the lift of said lifting means in accordance with vertical oscillatory movement of said control blade about its end so as to maintain a balance of transverse moments on the aircraft at various speeds of rotation of said lifting means, and means for rotating said blade about the blade axis.

8. In an aircraft, rotatable lifting means to create a direct lift, controllable means providing for an alteration of the lift, a control blade rotatable about an axis and oscillatable about an end under the action of the wind, means operably interconnecting the control blade to said controllable means to govern the alteration of the lift of said lifting means in accordance with oscillatory movement of said control blade about its end so as to maintain a balance of transverse moments on the aircraft at various speeds of rotation of said lifting means, and controllable means to alter the wind force effect on said control blade.

9. In an aircraft, a rotatable lifting means to create a direct lift, a body, means supporting said lifting means on said body for limited inclination of the axis of rotation of said lifting means with respect to the body, controllable means providing for an alteration of the lift of said lifting means, a control blade rotatable with said lifting means and supported for substantially unrestricted oscillatory movement about a radial end, and means operably interconnecting said blade with said controllable means to govern the alteration of the lift of said lifting means by oscillatory movement of said blade, said controllable means under the action of said control blade altering the lift of said lifting means along a direction so as to create a transverse moment thereon whose plane of action is more nearly parallel than perpendicular to the span of said control blade.

10. In an aircraft, rotatable lifting means to create a direct lift and comprising a plurality of wings one of which extends laterally when another extends longitudinally, controllable means for controlling the lift of said one wing in its laterally extending attitude independent of any control of a longitudinally extending wing, and a control aerofoil substantially vertically disposed with respect to said one wing for governing said controllable means.

11. In an aircraft, rotatable lifting wings to create a direct lift, controllable means for each wing to alter the lift of the wings, a rotatable control aerofoil for each wing, means independently and positively connecting each control aerofoil to its respective controllable means for alteration of the lift of the wing with which it is associated independently of the other wings, each control aerofoil lying more along than transverse to the span of the wing associated with it.

12. In an aircraft sustained directly by a wing system comprising a plurality of wings following each other about a closed path, an oscillatory element rotatable about an axis and substantially free to alter its plane of rotation when the wing path is tilted, controllable means for unsymmetrically altering the lifts of the wings, means for manually operating said rotatable element, and means operably interconnecting the rotatable element with the controllable means to automatically alter the lift of said wings independently of the manual control so that for a disturbing moment there is created on the wing system a moment at an angle to the disturbing moment in a direction to counteract the gyroscopic moment on the wing system.

13. In an aircraft, a body, a plurality of wings rotatable about an upright axis for sustaining said body, means providing for limited angular movement of said axis with respect to said body, means for restraining angular movement of said axis with respect to said body, controllable means to unsymmetrically alter the lift of the wings, and means to maintain a balance of moments on the wing system at right angles to a disturbing moment comprising rotatable aerofoils operatively interconnected to said controllable means to automatically alter the lift of said wings, said rotatable aerofoils being substantially free to alter their plane of rotation to a tilted plane of rotation under the combined control of centrifugal force and aerofoil reaction.

14. In an aircraft, a body, a wing system for sustaining said body including a plurality of wings rotatable in the same direction about a substantially upright axis and capable of experiencing a gyroscopic upsetting moment, supporting means rotatably supporting said wings for angular movement of said axis with respect to said body, means for yieldingly restraining any movement of said supporting means, controllable means for governing the lift of said wings, an oscillatory aerofoil device rotated by the wings and operably interconnected to said controllable means to automatically balance the gyroscopic moment on the wing system at right angles due to a disturbing moment, and means for manually controlling said aerofoil device independently of its automatic operation.

15. In an aircraft, a body, a direct sustaining system for said body, comprising a plurality of wings rotatable in the same direction about a substantially upright axis, means providing for restrained angular movement of said axis with respect to said body, an auxiliary aerofoil system to automatically counteract both the gyroscopic moments arising from a disturbing moment and the lift moment arising from the dissymmetry in relative wind velocity between the advancing and retreating wings, and means for manually controlling said auxiliary aerofoil system independently of its automatic operation.

16. In an aircraft sustained by a system of wings rotatable about a substantially upright axis, means to alter the lifts of the wings unsymmetrically, automatic means to govern the lift alteration to maintain a balance of moments on the wing system at right angles to a disturbing moment, said automatic means including a rotatable aerofoil element controlling a fluid flow through the wings for energizing the boundary layer of air on the wings.

17. In an aircraft sustained by a plurality of wings having means providing a flow of fluid therethrough for energizing the boundary layer of air, and control means to control the fluid flow through the wings to alter the lifts of the wings unsymmetrically, and automatic means to govern the lift alteration to maintain a balance of moments on the wing system at right angles to a disturbing moment, said automatic means including a rotatable inertia element controlling said control means.

18. In an aircraft, a wing system comprising a plurality of wings rotatable about a substantially upright axis and subjectable to disturbing moments, controllable means to alter the lift of the wings unsymmetrically on opposite sides of the axis of rotation, control aerofoils rotatable about the axis of the wing system but in a different plane of rotation and free to oscillate, means operably interconnecting the control aerofoils with the controllable means to automatically alter the lift of the wings so that the inertia moment at right angles to the disturbing moment is suppressed, and means for manually governing the lifts of the wings independently of the automatic control of said control aerofoils.

19. In an aircraft, rotatable lifting wings for creating a direct lift, means for producing an air flow through said rotatable wings to energize the boundary layer of air, a valve for each wing for controlling said air flow, a control aerofoil for each valve to automatically alter the lift of said wings to maintain the equilibrium of the aircraft, and pilot actuated means for manually controlling the air flow independently of the automatic operation of said control aerofoil so as to differentially alter the lift of opposed wings.

20. In an aircraft, a direct lift system comprising a plurality of wings movable relative to the aircraft about a closed path, said wings having openings in their surfaces, means to supply a flow of fluid therethrough for boundary layer energization, and automatic means for controlling the supply of fluid through said wings to alter the lift of the wings so as to automatically obtain equilibrium against gyroscopic moments at right angles to a disturbing moment.

21. In an aircraft, a direct lift system comprising a plurality of wings movable relative to the aircraft about a closed path, said wings having openings in their surfaces, means to supply a flow of fluid therethrough for boundary layer energization, means to alter the flow through the openings to alter the lift of the wings, and means to maintain a balance of moments on the wing system at right angles to a disturbing moment including control aerofoils rotatable about an axis and free to oscillate relatively to said axis when the wing path is tilted and operably interconnected with the means to alter the flow through the wing openings.

22. In an aircraft, a series of lifting wings rotatable about a substantially upright axis, each wing having in its surface an opening for discharging fluid toward the trailing edge of the wing for boundary layer energization, each wing having a compartment communicating with the wing opening, means for pumping fluid operably connected to said lifting wings and driven thereby, control means between the pumping means and the wing compartment to provide a control of the flow through the wing opening, a rotatable control aerofoil for each wing, and means operably connecting said control aerofoils to said control means.

23. In an aircraft, a sustaining wing system comprising a plurality of wings movable relative to the aircraft about a closed path and subjectable to gyroscopic moments, a governing inertia element freely movable relative to the aircraft in response to the aircraft's motion, controllable means for unsymmetrically altering the lifts of the wings and means operably interconnecting the said inertia element with the controllable means to automatically alter the lift of the wings so that for a disturbing moment there is created on the wing system a moment at an angle to the disturbing moment and in a direction to counteract the gyroscopic moment on the wing system.

24. In an aircraft, a wing system for direct sustaining effect comprising a plurality of wings movable relative to the aircraft along a closed path, controllable means to unsymmetrically alter the lifts of the wings, automatic control means connected to said controllable means to govern the alteration of the lift of the wings to maintain balance, and manual control means connected to said controllable means to alter the lifts of the wings for maneuvering independently of the operation of said automatic means, one of said control means having a connection in common with the other to said controllable means.

25. In a direct lift aircraft adapted for horizontal flight, a wing system comprising a plurality of wings rotatable about a vertical axis to create a direct lift, controllable means for each wing to alter unsymmetrically the lifts of the wings to create a transverse moment on said wing system, a control blade for each wing rotatable about a vertical axis and oscillatable relative thereto, means interconnecting each control blade to its respective controllable means to govern the lift alteration of its wing, the control blades being disposed relative to the wings so that when a majority of the wings are symmetrically disposed relative to the direction of horizontal flight, the control blades which are approaching the vertical plane through the direction of flight and the axis of rotation are nearer to their respective wings than the nearest portion of the said vertical plane.

26. In an aircraft, lifting wings rotatable about an axis to create a direct lift, controllable means for each wing to alter the lift of the wings, a rotatable control aerofoil for each wing, and means independently connecting each control aerofoil to its respective controllable means for alteration of the lift of the wing with which it is associated independently of alteration of the lift of the other wings, each control aerofoil being situated more nearly laterally than fore and aft with respect to the direction of horizontal flight when the wing associated with it extends perpendicular to said direction, the automatic operation of each control aerofoil being substantially free from hindrance from a reactive force from the lift change induced on the said wing by said control aerofoil.

27. In an aircraft, rotatable lifting means to create a direct lift and comprising a plurality of wings rotatable about an axis some of which are situated synchronously on opposite sides of the said axis of rotation, controllable means for controlling the lift of a wing situated on one side of the said axis independently of any control of a wing situated on the opposite side of said axis, and a control aerofoil extending laterally with respect to the direction of flight of the aircraft when a wing extends laterally perpendicular to the direction of horizontal flight of the aircraft, said control aerofoil being disposed out of the path of the wing associated with said control aerofoil.

28. In an aircraft adapted for horizontal flight, a body, a lifting means rotatable about an upright axis to sustain the aircraft by direct lift and extending laterally on both sides of said axis, the said lifting means being subject to an upsetting moment arising from variations of lift due to a difference in relative velocity on opposite sides of the direction of flight and the axis of rotation, means supporting said lifting means on said body for limited inclination of the path of rotation of said lifting means with respect to said body, controllable means providing for an alteration of the lift of said lifting means, a control blade rotatable into laterally extended positions, and means operably interconnecting said control blade with said controllable means to govern the alteration of lift of said lifting means to counteract the said upsetting moment, said control blade altering the lift of said lifting means along a radial direction on said lifting means to create a vertical counter-
acting moment and being nearer for all laterally extensive positions of said lifting means to the plane of action of the said counteracting moment thereon than to the portion of the plane of symmetry of the aircraft being approached by the said control blade, said plane passing through the direction of flight and said axis of rotation whereby the said counteracting moment is always substantially equal to the said upsetting moment.

29. In an aircraft sustained directly by a wing system comprising a plurality of wings rotatable about an upright axis, a body, and a prime mover to cause rotation of the wings; such a combination of means so interrelated that balance may be achieved about all axes substantially simultaneously and including an airfoil system rotatable by the said wing system about a horizontal axis to create different directional torques on the aircraft, manually operable means to incline the path of rotation of each wing relative to said body to create vertical tilting moments on the aircraft, and means to automatically suppress transverse moments on the aircraft arising from a dissymmetry in relative wind velocities between advancing and retreating wings and from gyroscopic action.

30. In an aircraft adapted for horizontal flight and subject to upsetting moments, lifting means to create a direct lift and comprising a plurality of wings rotatable about an axis, controllable means for each wing for altering the lifts of the wings unsymmetrically, a control blade mounted for oscillation relative to the aircraft, means interconnecting said control blade and said lifting means to automatically control the alteration in the lifts unsymmetrically in accordance with the oscillation of said blade to achieve a balance of said lifting means against upsetting moments, said control blade altering unsymmetrically the lift of wings which lie more nearly along than transverse to the plane of oscillation of said control blade, the automatic operation of said control blade being substantially free from hinderance by a reactive force from the lift change induced on a said wing.

EDWARD A. STALKER.